No. 862,089. PATENTED JULY 30, 1907.
W. W. MELLOR.
SEPARATION OF BUTTER FROM CREAM OR MILK.
APPLICATION FILED DEC. 11, 1906.

2 SHEETS—SHEET 1.

WITNESSES
Alvin J. White
W. P. Burke

INVENTOR
William Wood Mellor
BY Richards
ATTYS

No. 862,089. PATENTED JULY 30, 1907.
W. W. MELLOR.
SEPARATION OF BUTTER FROM CREAM OR MILK.
APPLICATION FILED DEC. 11, 1906.

2 SHEETS—SHEET 2.

WITNESSES
INVENTOR
William Wood Mellor
ATTYS

UNITED STATES PATENT OFFICE.

WILLIAM WOOD MELLOR, OF SEAFORTH, NEAR LIVERPOOL, ENGLAND, ASSIGNOR OF ONE-HALF TO FREDERIC NEVILE BAILDON, OF BIRKENHEAD, ENGLAND.

SEPARATION OF BUTTER FROM CREAM OR MILK.

No. 862,089.　　　　　Specification of Letters Patent.　　　　　Patented July 30, 1907.

Application filed December 11, 1906. Serial No. 347,317.

To all whom it may concern:

Be it known that I, WILLIAM WOOD MELLOR, a subject of the King of England, residing at Seaforth, near Liverpool, in the county of Lancaster, England, have invented new and useful Improvements in or Connected with the Separation of Butter from Cream or Milk, of which the following is a specification.

This invention has reference to apparatus or machines for the production or separation of butter from cream or milk wherein such cream or milk is subjected to the action of a rotary body dipping into the liquid, and revolving at a high rate of speed, and being conveyed and thrown through air by it; and it has primarily for its objects and effects, to provide improvements hereinafter described and set out in the claiming clauses concluding the specification, whereby the production or separation of the butter from the cream or milk can be, and is accomplished while it is either in the fresh or "unripened" state, (or "ripened" in the ordinary way) to produce butter which is capable of "keeping" without material deterioration, better and longer than butters generally; to render the production or separation capable of being effected at practically any natural low temperature, including periods of severe frosts; to produce butter of better food value, finer texture, and of generally an improved or high-class character and of uniform quality; and to provide a machine of a simple and inexpensive type, and so arranged and constructed that the various parts may be easily cleaned, and the operations as a whole can be manipulated and carried out with ease and convenience.

The invention will be described with the aid of the accompanying drawings, and its novel characteristics are set out in the claiming clauses concluding the specification.

Figure 1:
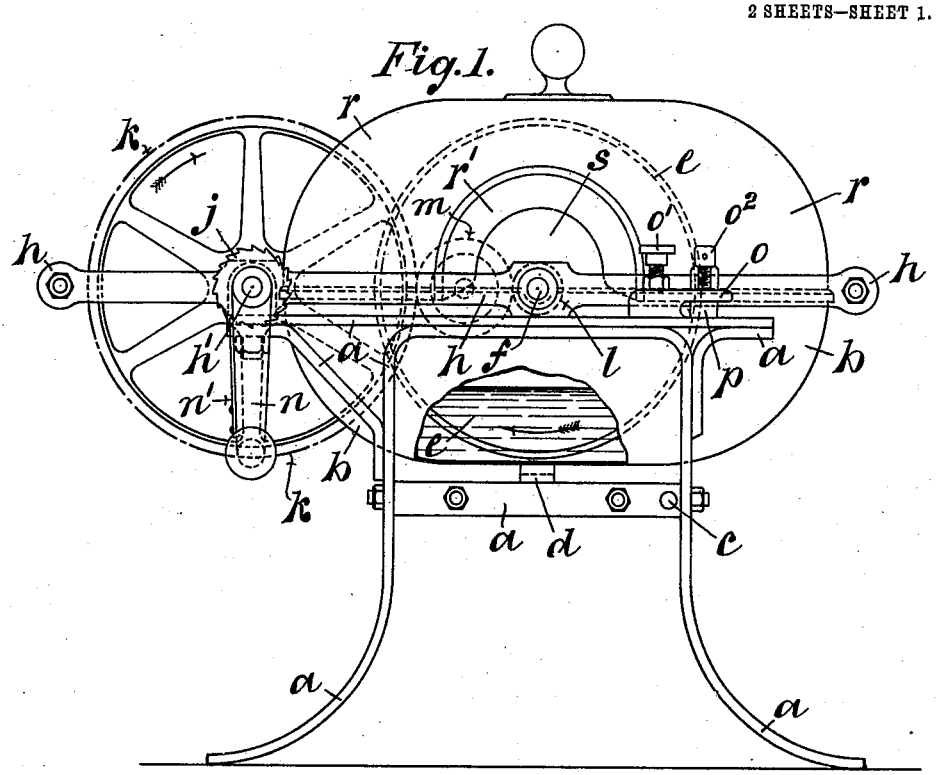
Figure 2:
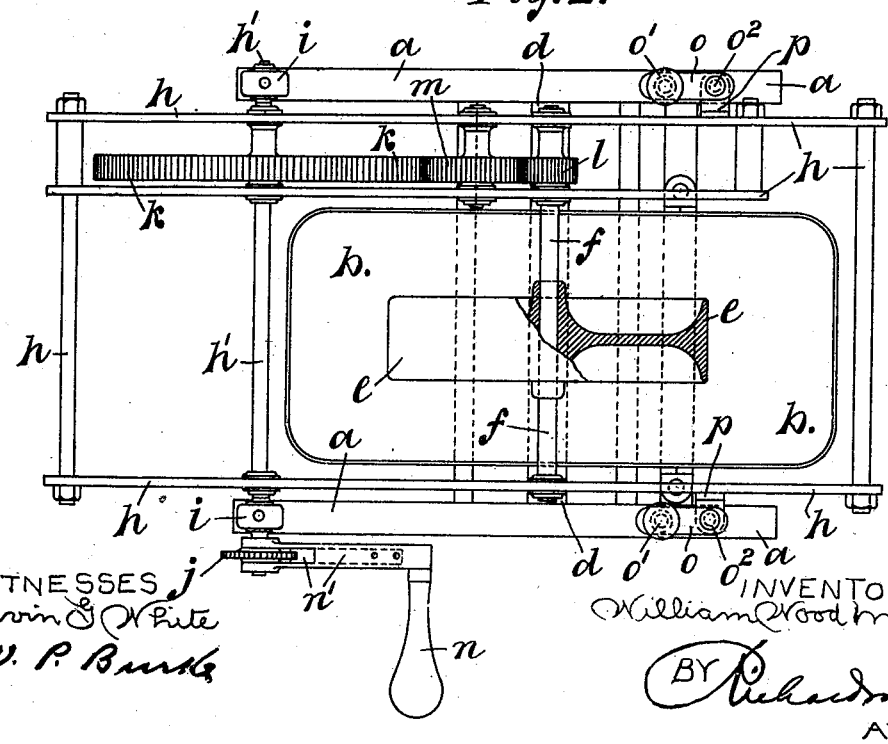
Figure 3:
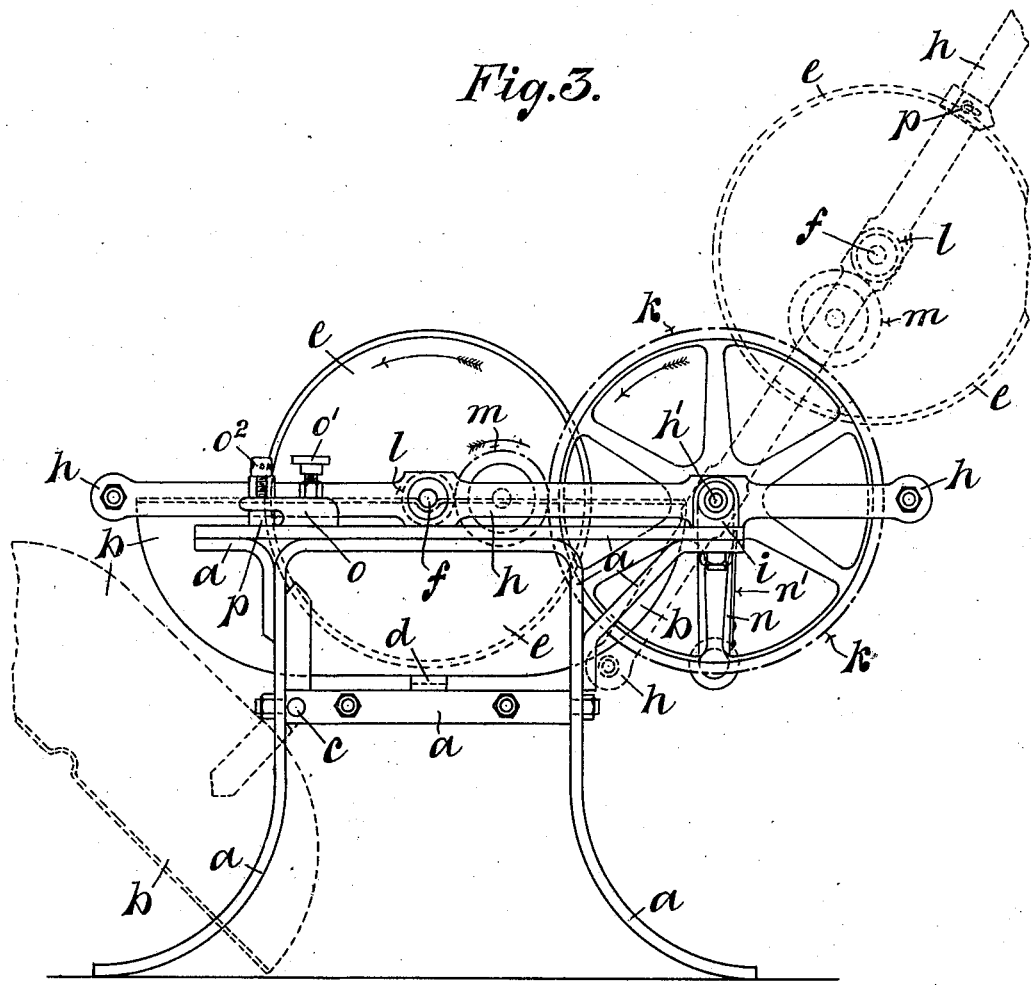
Figure 4:
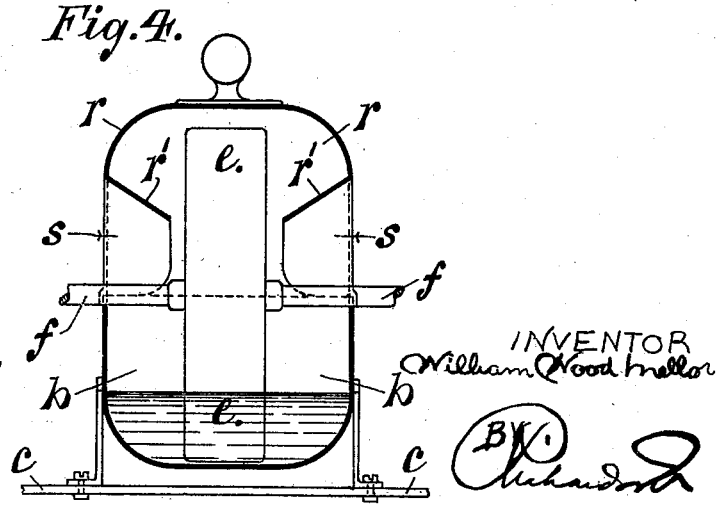

In the drawings, Figure 1 is a side elevation of the machine or churn; Fig. 2 is a plan with the cover removed; Fig. 3 is a side elevation with the cover removed, showing the opposite side of it to that given in Fig. 1; and Fig. 4 is a transverse section through the apparatus or churn.

In the machine or apparatus shown in the drawings, the several parts of which it is comprised are mounted on a frame $a$, and directly supported on this frame or stand is a vessel or container $b$, in which the milk or cream is held and operated upon, it being hinged towards one end and near the bottom upon hinges $c$ in the frame, about which it is capable of being tipped over or being rocked, as indicated in the dotted lines in Fig. 3, so that the contents can be easily and quickly discharged as and when desired without handling; while, normally, it rests at one end on this hinge, and at the other on a suitable support $d$ under the bottom carried from the frame $a$.

The rotary separating wheel, designated $e$, is mounted on an axle $f$, which is carried in a swinging frame $h$, hinged and supported in bearings $i$ at one end of the machine, and the frame $a$ opposite the hinges $c$ supporting the container $b$, and slightly above the level of this container; and by means of this frame, the wheel $e$ can be moved radially down about the hinged shaft $h^1$ supported in the bearings $i$, into the container $b$, and subsequently swung up and out of the way as and when desired, that is, when it is desired to remove the contents of this container. This frame also carries the operating gear, which, in the case shown, consists of a driving spur wheel $k$ on the shaft $h^1$, a driven pinion $l$ on the shaft $f$, and a toothed wheel $m$ intermediate the wheels $k$ and $l$, revolved by the crank handle $n$; this crank handle being loosely mounted on the shaft $h^1$, and adapted to engage and drive it when revolved in one direction, and allow it to be free when moved in the other direction, and to permit of the wheel $e$ to revolve, due to its momentum, when the handle $n$ is held. This is effected by providing a ratchet wheel $j$ on the shaft $h^1$, and a spring pawl $n^1$ on the handle $n$, the end of which engages with the teeth of the wheel $j$.

The container $b$ is fastened in its normal position of use to the frame $a$ by buttons $o$, hinged and fastened by hinged pins $o'$ to the frame $a$, about which they are free to swing in the horizontal plane, and the ends of which are adapted to fit over lugs $p$ on the side of the container $b$, when the container is in the normal position, such lugs resting on the upper surfaces of the horizontal members of the frame $a$; and these parts are clamped in position by the clamping screw $o^2$ screwing through the end of the button $o$. Above the container $b$ is a cover $r$ of similar form to the container $b$, and making a joint with its upper edge when fitted in position. The cover $r$ has apertures as $s$, as shown in Figs. 1 and 4, these apertures being of sufficient area to allow of the free admission and circulation of air through, and the escape of gases from the interior of the machine when the cover is on; these apertures, in the case shown, being concentric with the wheel axle $f$; and thus the operation goes on in the presence of air freely admitted to the container. Around these apertures on each side is an inwardly projecting and inclined half-hoop or shelf $r^1$, inclined from the sides of the cover $r$ towards the center as shown, by means of which any liquid which may be thrown or splashed up is prevented from escaping from the vessel, and is returned to the container $b$, while at the same time, allowing free admission and circulation of air into and through the container.

In and by the apparatus herein described, the adhesion of the butter particles is overcome, and a complete separation effected by the force acting on the combined particles of butter and buttermilk, giving them a uniform impulse and causing them to travel through the air. And by the wheel or rotary body $e$ being made with a relatively broad periphery, with the radii of its surface all equal to each other, the force imparted by its revolution, will be equal and uniform throughout.

The sides or ends of the wheel or rotary body e are curved as shown, in order to induce a flow of the fluid into the track of the periphery, and so prevent any particles being carried round by contact with the sides or ends. And the wheel or rotary body being mounted on a swinging frame in the manner described, it admits of it being lowered into the container, and there automatically adjusted for work, and of being swung out radially to a position of rest when required. And the shaft on which the wheel or rotary body is mounted, being carried by the radial arms of the swinging frame in the manner described, they are at all times clear of the container, thus avoiding any contamination of its contents, which might otherwise arise.

In action, assuming the machine to be in the position shown in full lines in Fig. 3, that is, with the cover r removed, and the other parts in position, such a quantity of cream or milk is then poured into the container b, as will submerge about one-fourth of the diameter of the rotating wheel, and the cover r placed on the container, as shown in Figs. 1 and 4; and the wheel e is then revolved by means of the crank handle n and the driving gearing, at a high velocity, preferably at a rate somewhere in the neighborhood of 2,000 peripheral feet per minute. When this rate is attained, separation takes place immediately, and the butter in a granular formation is seen floating on the surface of the buttermilk. Whereupon the cover r is removed, the wheel e swung out of the container to a place of rest, and the container b is tilted, and the buttermilk run off. The container b having been returned to the horizontal, water is poured onto the butter for the purpose of washing it. The wheel e is then returned to its position for work, and there clamped, and the cover r is replaced; and in this condition the washing is effected by the revolution of the wheel. This operation should be repeated, if required, until the water is seen to run off the internal flanges $r^1$ without trace of buttermilk, when the washing is completed.

The apparatus is cleansed by passing boiling water through it, with the wheel revolving.

The "keeping" quality of butter, and its texture and flavor are materially affected by the presence of buttermilk, and also of particles reduced to a greasy state. Butter produced by this apparatus is free from both defects. The separation obtained is absolute, and pounding of the butter granules during or after formation is prevented.

By the rotation and action of the wheel e, the liquid piles up in the container at that end of the wheel which is rising out of the liquid, and also at that which is moving down into it, the depth of liquid in the center being very small.

It is found advantageous that the depth of distance and thickness of liquid between the part of the periphery of the wheel e nearest the bottom, and the bottom of the container b, should be small—say about 1/16th of an inch, more or less. The action of the wheel on the milk or cream is most efficient for the purposes of the process, with this relative disposition.

When the conveyer wheel is of the type shown, viz., it has a web-plate with a relatively wide rim, the juncture of the web and the rim, and the web and hub, are curved out as shown, for the purpose of throwing the liquid or butter out and off it, into the container, and so back into the track of the wheel, and preventing the lodging of it in the wheel, and any rubbing contact between the sides of the wheel and the butter granules during or after formation. By this the formation of grease is obviated.

The shelves or flanges $r^1$ above the air openings s are inclined from the sides of the cover r towards the center as shown, to direct any matters falling onto them inwards towards the interior of the container. The apertures s beyond serving as a means for allowing the free entrance and circulation of air into and through the container or vessels, and the escape of gases, also enable the interior of the machine, and the condition of the substance within it being operated upon, to be seen.

The construction of the containers b and cover r with its several curves at the sides and ends is further advantageous, in that it enables them to be readily cleaned in the manner just described, and prevents the collecting of butter in any part, and conducts the fluid towards the track of the wheel.

What I do claim as my invention, and desire to secure by Letters Patent is:—

1. In apparatus for the separation of butter from cream or milk, a cylindrical rotary wheel, and a container inclosing said wheel and in which said wheel revolves, having openings in its walls above the cream or milk level, through which air is freely admitted to and circulates; as set forth.

2. In apparatus for the separation of butter from cream or milk, a cylindrical rotary wheel, a container in which said wheel revolves having air inlets at each side about the axis of the wheel or drum, and internal shelves projecting inwards from said inlets; substantially as set forth.

3. In apparatus for the separation of butter from cream or milk, comprising a lower containing part b constituting substantially half of same the container body, and an upper cover, r, of similar form, fitting on the top of b, and having air inlets s in its sides; substantially as set forth.

4. In apparatus for the separation of butter from cream or milk, a rotary wheel, and a frame hinged in supports parallel with said wheel axis, whereby said frame can be swung up and the wheel moved out of the milk or cream container; substantially as described.

5. In apparatus for the separation of butter from cream or milk a wheel e, a lower container b hinged towards one end of same, a frame h, carrying said wheel, having hinged supports at the opposite side of the apparatus to the container hinge, whereby the said wheel in being moved out of the apparatus is swung in one direction, and the container b is swung in tipping it, in the opposite direction; as set forth.

6. In apparatus for the separation of butter from cream or milk, a cylindrical wheel e and a container b having a substantially horizontal bottom, the periphery of the said cylindrical wheel being in close proximity to the bottom of said container, and the distance between the periphery of the wheel at the intake end of the container and the discharge end is relatively large; while the sides of the container on each side of the wheel are curved or inclined downwards towards the edges of the wheel, to lead the cream or milk towards the same, substantially as described.

In testimony whereof I have signed my name to this specification in the presence of two subscribing witnesses.

WILLIAM WOOD MELLOR.

Witnesses:
S. GOODALL,
T. OKE.